Figure 1:
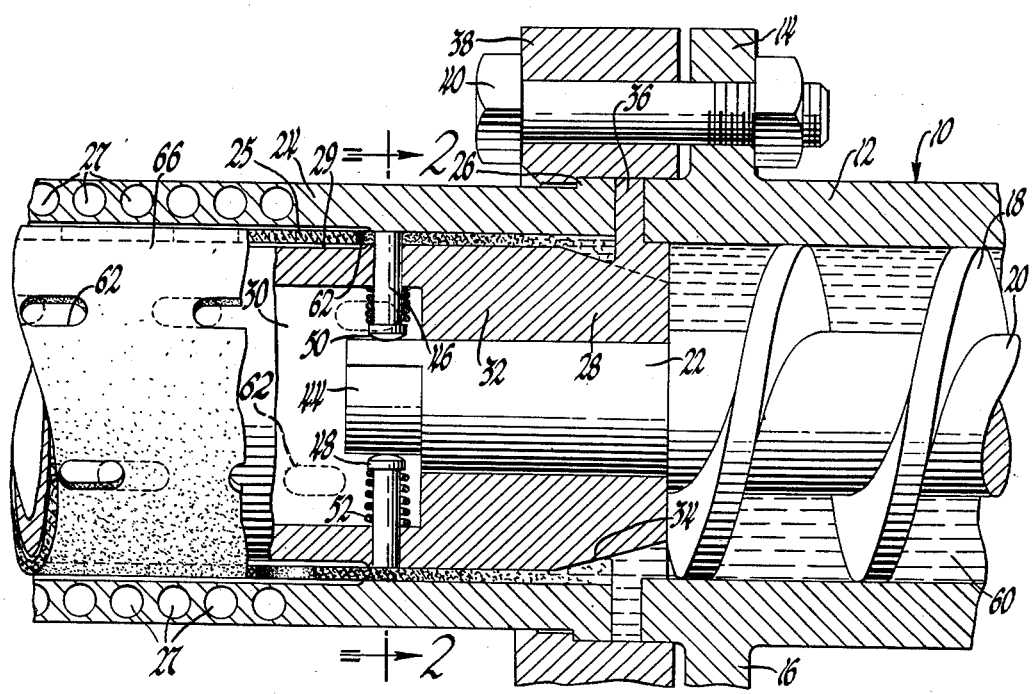

May 20, 1958

J. A. NORTON 2,834,983

APPARATUS FOR FABRICATION OF PERFORATED TUBES

Filed Nov. 30, 1955

INVENTOR
James A. Norton
BY J. W. Lovett
ATTORNEY

United States Patent Office 2,834,983
Patented May 20, 1958

2,834,983
APPARATUS FOR FABRICATION OF PERFORATED TUBES

James A. Norton, Flint, Mich., assignor to General Motors Corporation, Detroit, Mich., a corporation of Delaware Application November 30, 1955, Serial No. 550,045

2 Claims. (Cl. 18—14)

This invention relates to tubes and more particularly to apparatus for forming perforated tubes of plastic material suitable for a broad range of uses such as serving as shells for filter elements employed in clarifying lubricating oil.

The term "plastic" as employed herein is used to indicate a material capable of being molded or of receiving a desired form by way of extrusion. That characteristic is well known to reside in plastics, lead, ceramic mixes and other materials, and the present invention contemplates their use.

An object of the present invention is to provide an improved apparatus by means of which plastic tubes may be simultaneously formed and perforated.

These and other important objects of the invention will now be described in detail in the specification and then pointed out more particularly in the appended claims.

Figure 2:
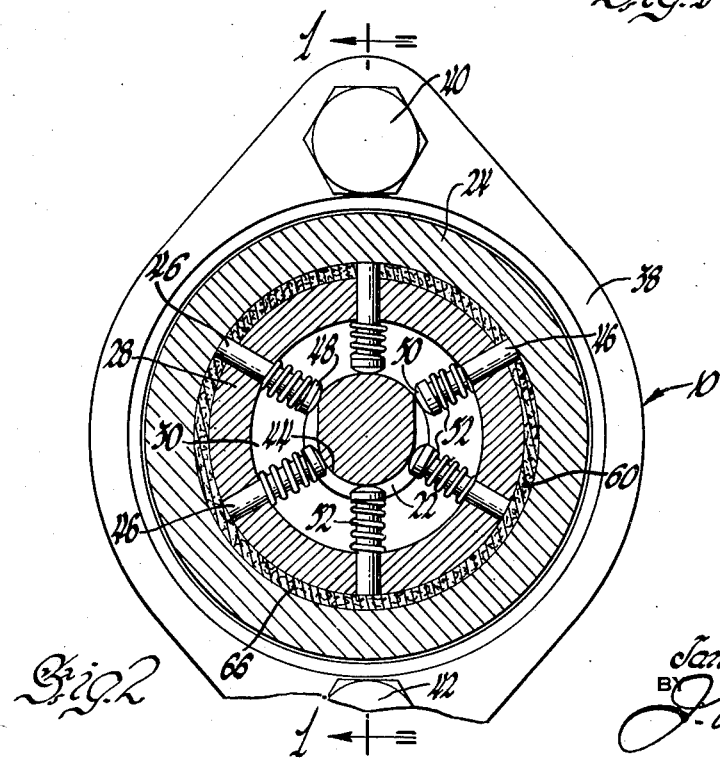

In the drawings:

Fig. 1 is a cross-sectional view of an extruding and forming apparatus showing features of the present invention and suitable for use in carrying out the method, the view being taken along the line 1—1 of Fig. 2; and Fig. 2 is a sectional view looking in the direction of the arrows 2—2 in Fig. 1.

In the drawings, the apparatus therein shown is designed specifically for the purpose of forming nylon plastic perforated shells for use as containers of filtering material. Such filled containers are employed as replacement filter elements for clarifying lubricating oil in automobiles. It is clear, however, that this is only one example of the type of tube material which could be used in carrying out the present invention and filter shells represent only one field of use for the perforated tubes.

In Fig. 1 an extruder nozzle is generally indicated at 10. This nozzle comprises an extruder tube 12 having oppositely extending ears 14 and 16 located near the discharge end of the tube. Closely fitted within the extruder tube 12 is a rotatable screw 18 having a shaft 20 with a reduced end portion 22 of the latter extending from the tube 12.

Arranged coaxially with the tube 12 is a discharge tube 24 one end of which terminates short of the discharge end of the tube 12 and is provided with an annular shoulder or flange 26.

Arranged coaxially within and spaced from the tube 24 is a mandrel 28. This mandrel is chambered as at 30 except at its end portion 32 where it forms a journal for the reduced portion 22 of the shaft 20. It will also be noted that one end of the mandrel 28 is tapered as at 34 to face the interior of the extruder nozzle 12. Spaced around and integral with the tapered end of the mandrel are a number of radially disposed projections such as the projection 36 and these are interposed between the ends of the tubes 12 and 24 to form a support for the mandrel 28. This support is possible because a ring 38 is so made as to engage the shoulder 26 and be held to the ears 14 and 16 by bolts 40 and 42 to clamp the parts together.

The end of the shaft 20 extends into the mandrel chamber 30 and is formed into a cam 44 the outline or contour of which is clearly seen in Fig. 2.

Arranged at an angle and preferably radially with respect to the axis of the mandrel 28 are six pins 46 which are placed in spaced and sliding relation within the mandrel. Each pin bears a head 48 with a curved surface 50 adapted constantly to engage the outer surface of the cam 44. A spring 52 is arranged around each of the pins 46 and one end thereof bears against a shoulder of the head tending to urge the pin towards the cam. The other end of each spring rests against the interior wall of the mandrel chamber 30.

Preferably, the discharge tube 24 and the mandrel 28 are recessed on the discharge side of the pins 46 as at 25 and 29 respectively, permitting a slight expansion of the extruded material as will further appear.

The tube 24 or the mandrel or both of these elements may be used to support the extruded work as it is urged through the apparatus. In the drawing the tube 24 and mandrel are broken off as it is appreciated that their lengths would be such as to suit a given situation. The tube 24 is shown with passages 27 through which a cooling medium may be circulated.

In operation, a thermoplastic material 60, heated to become sufficiently fluid for extrusion purposes and which may be nylon plastic, is forced by the power rotated screw 18 into the annular and cylindrical space defined between the mandrel 28 and the discharge tube 24. With a continual extrusion of the plastic material, the plastic tube is formed and simultaneously with that action the rotation of the cam 44 causes the pins 46 to pierce the wall of the tube by traversing the space referred to. Because of this action, a given pin 46 will cause the plastic material to flow around it and form a slot or perforation 62. The cooling medium in the passages 27 causes the plastic material to set into a stabilized form with a slight expansion into the recesses 25 and 29 as the extrusion takes place. As a result, the final product is a cylindrical tube 66 having a series of slots therein and which may be used for many purposes.

If desired, the discharge tube 24 may be directed downwardly into a bath of such a nature as to harden the extruded work and it is obvious that the tube formed may have a square, rectangular, elliptical or other form of cross-section without departing from the principles of the present invention.

The pins 46 are each circular in cross-section but they may be square cut if desired. With some plastics there may be a tendency for the material to flow together at the discharge sides of the pins 46 before the material has time to set. This difficulty may be at least partially overcome by giving the pins an elongated cross-section but the tendency will depend upon the viscosity index of the plastic, its viscosity at molding or extrusion temperatures, its temperature drop beyond the pins 46, any change in shape of the die elements tending to compress or free the plastic beyond the pins, and other factors.

Insofar as the method is concerned, the pins 46 could be driven inwardly by a cam or other power means instead of outwardly to form the perforations, but the apparatus disclosed is preferred because of its compactness and simplicity. No scrap results in the forming of the perforations as the displaced plastic flows around the pins. The slits or perforations are formed only as long as the pins serve as impediments to the plastic flow. When the pins are withdrawn by the springs 52, the extruded work portion passing by the ends of the pins will be uniform and unperforated. It necessarily follows that the length and number of spaced perforations in a given workpiece may be varied by changing the dwell periods of the pins 46 in their extended and retracted positions, the pins being operated by a cam as shown in the drawings, by a hydraulic system, solenoids, or a combination of these expedients. As in the drawings, it is preferred to operate the pins 46 in non-synchronous or sequential order but this order may be varied by changing the cam or other means driving the pins.

I claim:

1. Apparatus for forming perforated tubes suitable to serve as shells for filter elements, said apparatus comprising an extruding nozzle, a discharge tube coaxial with and joined to said nozzle, a mandrel supported in spaced relation to and located within said discharge tube, pins radially located within said mandrel and with respect to the axes of said mandrel and tube, means arranged intermittently to cause one end of each of said pins to traverse the space between said discharge tube and mandrel, and means associated with said discharge tube on the discharge side of said pins for setting material passed through the latter.

2. Apparatus for forming perforated tubes comprising an extruding nozzle with a rotatable screw therein, a discharge tube coaxial with and joined to said nozzle, a mandrel supported in coaxial and spaced relation to said discharge tube, one end of said screw being journaled in one end of said mandrel and being provided with a cam, pins mounted in said mandrel and arranged to move radially with respect thereto, and said cam being so arranged as to cause said pins sequentially to traverse the space between said discharge tube and mandrel.

References Cited in the file of this patent

UNITED STATES PATENTS

| | | |
|---|---|---|
| 293,525 | Schillinger | Feb. 12, 1884 |
| 1,370,800 | Egerton | Mar. 8, 1921 |
| 1,408,877 | Funk | Mar. 7, 1922 |
| 2,582,645 | Milliken et al. | Jan. 15, 1952 |
| 2,680,276 | Filangeri | June 8, 1954 |